United States Patent
Chobot (10) Patent No.: US 9,854,634 B2
(45) Date of Patent: *Dec. 26, 2017

(54) SOLID STATE LIGHTING SWITCHES AND FIXTURES PROVIDING DIMMING AND COLOR CONTROL

(71) Applicant: Cree, Inc., Durham, NC (US)

(72) Inventor: Joseph Paul Chobot, Morrisville, NC (US)

(73) Assignee: Cree, Inc., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/394,962

(22) Filed: Dec. 30, 2016

(65) Prior Publication Data

US 2017/0111970 A1  Apr. 20, 2017

Related U.S. Application Data

(63) Continuation of application No. 14/270,977, filed on May 6, 2014, now Pat. No. 9,560,708, which is a
(Continued)

(51) Int. Cl.
| | |
|---|---|
| H01J 1/60 | (2006.01) |
| H01J 7/42 | (2006.01) |
| H05B 37/04 | (2006.01) |
| H05B 33/08 | (2006.01) |
| H05B 37/02 | (2006.01) |

(52) U.S. Cl.
CPC ....... H05B 33/0845 (2013.01); H05B 33/083 (2013.01); H05B 33/0857 (2013.01); H05B 37/0227 (2013.01); H05B 37/0272 (2013.01)

(58) Field of Classification Search
None
See application file for complete search history.

(56) References Cited

U.S. PATENT DOCUMENTS

| | | |
|---|---|---|
| 4,743,897 A | 5/1988 | Perez |
| 5,384,519 A | 1/1995 | Gotoh |

(Continued)

FOREIGN PATENT DOCUMENTS

| | | |
|---|---|---|
| CN | 101821544 A | 9/2010 |
| CN | 101889475 A | 11/2010 |

(Continued)

OTHER PUBLICATIONS

International Search Report corresponding to International Application No. PCT/US2012/064434; dated Jan. 25, 2013; 11 pages.
(Continued)

*Primary Examiner* — Anh Tran
(74) *Attorney, Agent, or Firm* — Coats & Bennett, PLLC (57) ABSTRACT

A solid state lighting switch can include a first input control that can be configured to adjust a dimming indication or color indication for a solid state lighting fixture that is configured for coupling to the solid state lighting switch. A selective linking mechanism can be configured to activate a linked mode of operation of the switch to link the dimming indication to the color indication or to activate an unlinked mode of operation of the switch to unlink the dimming indication from the color indication.

27 Claims, 5 Drawing Sheets

Related U.S. Application Data continuation of application No. 13/295,609, filed on Nov. 14, 2011, now Pat. No. 8,736,186.

(56) References Cited

U.S. PATENT DOCUMENTS

| | | | |
|---|---|---|---|
| 5,521,708 A | 5/1996 | Beretta | |
| 5,847,340 A | 12/1998 | Godesa | |
| 6,781,329 B2 | 8/2004 | Mueller et al. | |
| 6,897,624 B2 | 5/2005 | Lys et al. | |
| 7,161,313 B2 | 1/2007 | Piepgras et al. | |
| 7,186,003 B2 | 3/2007 | Dowling et al. | |
| 7,213,940 B1 | 5/2007 | van de Ven et al. | |
| 7,238,898 B1 | 7/2007 | Czarnecki | |
| 7,385,359 B2 | 6/2008 | Dowling et al. | |
| 7,821,194 B2 | 10/2010 | Negley et al. | |
| 7,967,652 B2 | 6/2011 | Emerson | |
| 8,736,186 B2 * | 5/2014 | Chobot | H05B 33/0863 315/186 |
| 9,560,708 B2 * | 1/2017 | Chobot | H05B 33/0863 |
| 2004/0233145 A1 | 11/2004 | Chiang | |
| 2004/0245946 A1 | 12/2004 | Halter | |
| 2005/0047134 A1 | 3/2005 | Mueller et al. | |
| 2005/0122065 A1 | 6/2005 | Young | |
| 2005/0243022 A1 | 11/2005 | Negru | |
| 2006/0016960 A1 | 1/2006 | Morgan et al. | |
| 2006/0076908 A1 * | 4/2006 | Morgan | H05B 33/0842 315/312 |
| 2006/0081773 A1 | 4/2006 | Rains, Jr. et al. | |
| 2006/0273331 A1 | 12/2006 | Lim et al. | |
| 2007/0051883 A1 | 3/2007 | Rains, Jr. et al. | |
| 2007/0139920 A1 | 6/2007 | van de Ven et al. | |
| 2007/0170447 A1 | 7/2007 | Negley et al. | |
| 2007/0247089 A1 | 10/2007 | Summerland | |
| 2007/0263393 A1 | 11/2007 | van de Ven | |
| 2007/0267983 A1 | 11/2007 | van de Ven et al. | |
| 2007/0273299 A1 | 11/2007 | Miskin et al. | |
| 2008/0001547 A1 | 1/2008 | Negru | |
| 2008/0043464 A1 | 2/2008 | Ashdown | |
| 2009/0079362 A1 | 3/2009 | Shteynberg et al. | |
| 2009/0160363 A1 | 6/2009 | Negley et al. | |
| 2009/0184616 A1 | 7/2009 | van de Ven et al. | |
| 2009/0189529 A1 | 7/2009 | Negley et al. | |
| 2009/0243509 A1 | 10/2009 | Barnett et al. | |
| 2010/0002440 A1 | 1/2010 | Negley et al. | |
| 2010/0072903 A1 * | 3/2010 | Blaut | H05B 33/0863 315/185 R |
| 2010/0109570 A1 | 5/2010 | Weaver | |
| 2010/0134018 A1 | 6/2010 | Tziony et al. | |
| 2010/0171444 A1 | 7/2010 | Bennette | |
| 2010/0244707 A1 | 9/2010 | Gaines et al. | |
| 2011/0037413 A1 | 2/2011 | Negley et al. | |
| 2011/0068696 A1 | 3/2011 | van de Ven et al. | |
| 2011/0068701 A1 | 3/2011 | van de Ven et al. | |
| 2011/0068702 A1 | 3/2011 | van de Ven et al. | |
| 2011/0210674 A1 | 9/2011 | Melanson | |
| 2013/0002167 A1 | 1/2013 | van de Ven | |
| 2013/0207559 A1 | 8/2013 | Ferrier | |

FOREIGN PATENT DOCUMENTS

| | | |
|---|---|---|
| JP | 2007-059260 | 3/2007 |
| JP | 2007-110075 | 4/2007 |
| JP | 2008-226473 | 9/2008 |
| JP | 2010-008694 | 1/2010 |
| WO | WO 03/096761 | 11/2003 |
| WO | WO 2008/129485 A1 | 10/2008 |
| WO | WO 2009/049019 | 4/2009 |
| WO | WO 2011/037752 A2 | 3/2011 |

OTHER PUBLICATIONS

Chobot "Lighting Apparatus Using a Non-Linear Current Sensor and Methods of Operation Thereof," U.S. Appl. No. 12/968,789, filed Dec. 15, 2010, 41 pages.

Chinese First Office Action corresponding to Chinese Patent Application No. 201280034828.8; Date of Notification: Jan. 5, 2015; Foreign Text, 14 pages, English Translation Thereof, 9 pages.

European Partial Supplementary Report Corresponding to European Patent Application No. EP12850396, dated Jun. 21, 2016; 6 pages.

Supplementary European Search Report, corresponding to EP Patent Application No. EP12850396, dated Oct. 25, 2016, pages.

Supplementary European Search Report, corresponding to EP Application No. EP12792795, dated Nov. 11, 2015, 6 pages.

Notification Concerning Transmittal of International Preliminary Report on Patentability, Application No. PCT/US2012/050189, dated Dec. 19, 2013, 13 pages.

* cited by examiner

SOLID STATE LIGHTING SWITCHES AND FIXTURES PROVIDING DIMMING AND COLOR CONTROL

CROSS-REFERENCE TO RELATED APPLICATIONS

This application is a continuation of U.S. patent Ser. No. 14/270,977; Filed May 6, 2014 which is a continuation of U.S. patent application Ser. No. 13/295,609, filed Nov. 14, 2011 in the United States Patent and Trademark Office, the disclosures of which are incorporated herein by reference in their entirety.

FIELD OF THE INVENTION

The present invention relates to solid state lighting, and more particularly to solid state lighting systems including a plurality of solid state lighting devices and methods of operating solid state lighting systems including a plurality of solid state lighting devices.

BACKGROUND

Solid state lighting arrays are used for a number of lighting applications. For example, solid state lighting panels including arrays of solid state light emitting devices have been used as direct illumination sources, for example, in architectural and/or accent lighting. A solid state light emitting device may include, for example, a packaged light emitting device including one or more light emitting diodes (LEDs). Inorganic LEDs typically include semiconductor layers forming p-n junctions. Organic LEDs (OLEDs), which include organic light emission layers, are another type of solid state light emitting device. Typically, a solid state light emitting device generates light through the recombination of electronic carriers, i.e. electrons and holes, in a light emitting layer or region.

Solid state lighting panels are commonly used as backlights for small liquid crystal display (LCD) screens, such as LCD display screens used in portable electronic devices. In addition, there has been increased interest in the use of solid state lighting panels as backlights for larger displays, such as LCD television displays.

For smaller LCD screens, backlight assemblies typically employ white LED lighting devices that include a blue-emitting LED coated with a wavelength conversion phosphor that converts some of the blue light emitted by the LED into yellow light. The resulting light, which is a combination of blue light and yellow light, may appear white to an observer. However, while light generated by such an arrangement may appear white, objects illuminated by such light may not appear to have a natural coloring, because of the limited spectrum of the light. For example, because the light may have little energy in the red portion of the visible spectrum, red colors in an object may not be illuminated well by such light. As a result, the object may appear to have an unnatural coloring when viewed under such a light source.

Visible light may include light having many different wavelengths. The apparent color of visible light can be illustrated with reference to a two dimensional chromaticity diagram, such as the 1931 International Conference on Illumination (CIE) Chromaticity Diagram illustrated in FIG. 9, and the 1976 CIE u'v' Chromaticity Diagram, which is similar to the 1931 Diagram but is modified such that similar distances on the 1976 u'v' CIE Chromaticity Diagram represent similar perceived differences in color. These diagrams provide useful reference for defining colors as weighted sums of colors.

In a CIE-u'v' chromaticity diagram, such as the 1976 CIE Chromaticity Diagram, chromaticity values are plotted using scaled u- and v-parameters which take into account differences in human visual perception. That is, the human visual system is more responsive to certain wavelengths than others. For example, the human visual system is more responsive to green light than red light. The 1976 CIE-u'v' Chromaticity Diagram is scaled such that the mathematical distance from one chromaticity point to another chromaticity point on the diagram is proportional to the difference in color perceived by a human observer between the two chromaticity points. A chromaticity diagram in which the mathematical distance from one chromaticity point to another chromaticity point on the diagram is proportional to the difference in color perceived by a human observer between the two chromaticity points may be referred to as a perceptual chromaticity space. In contrast, in a non-perceptual chromaticity diagram, such as the 1931 CIE Chromaticity Diagram, two colors that are not distinguishably different may be located farther apart on the graph than two colors that are distinguishably different.

Figure 9:
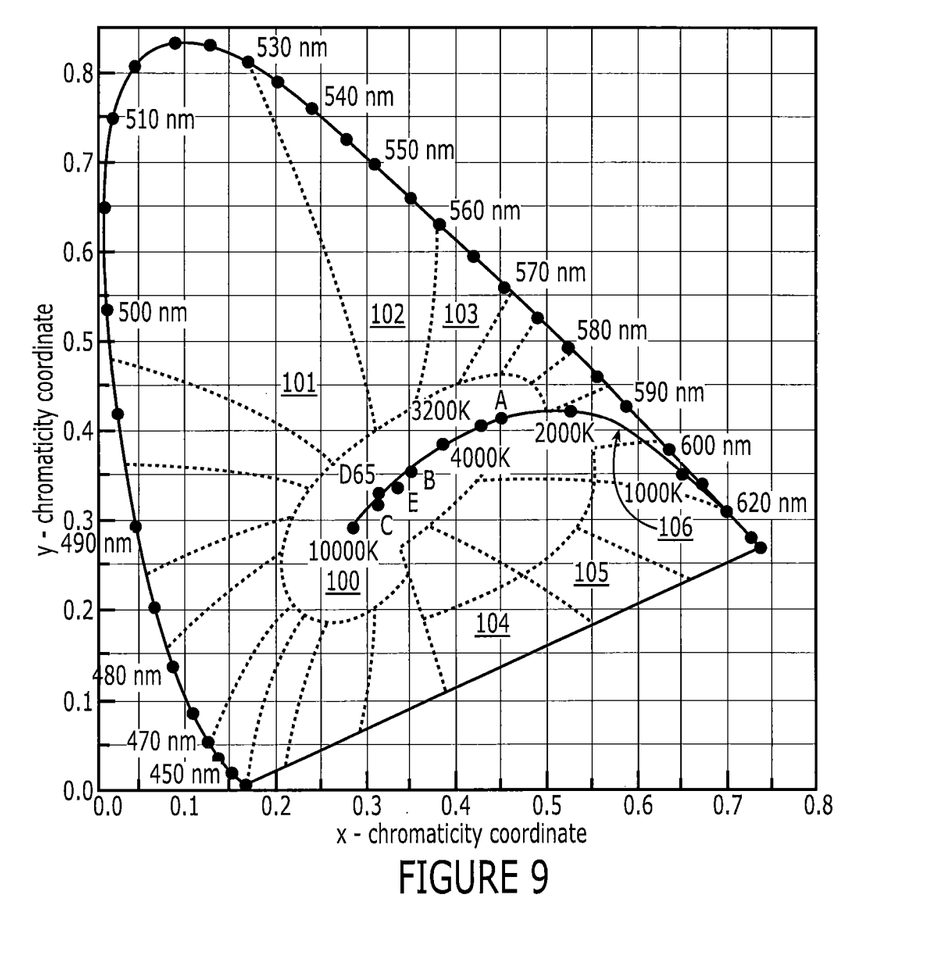
FIG. 9 is a 1931 CIE chromaticity diagram.

As shown in FIG. 9, colors on a 1931 CIE Chromaticity Diagram are defined by x and y coordinates (i.e., chromaticity coordinates, or color points) that fall within a generally U-shaped area. Colors on or near the outside of the area are saturated colors composed of light having a single wavelength, or a very small wavelength distribution. Colors on the interior of the area are unsaturated colors that are composed of a mixture of different wavelengths. White light, which can be a mixture of many different wavelengths, is generally found near the middle of the diagram, in the region labeled 100 in FIG. 9. There are many different hues of light that may be considered "white," as evidenced by the size of the region 100. For example, some "white" light, such as light generated by sodium vapor lighting devices, may appear yellowish in color, while other "white" light, such as light generated by some fluorescent lighting devices, may appear more bluish in color.

Light that generally appears green is plotted in the regions 101, 102 and 103 that are above the white region 100, while light below the white region 100 generally appears pink, purple or magenta. For example, light plotted in regions 104 and 105 of FIG. 9 generally appears magenta (i.e., red-purple or purplish red).

It is further known that a binary combination of light from two different light sources may appear to have a different color than either of the two constituent colors. The color of the combined light may depend on the relative intensities of the two light sources. For example, light emitted by a combination of a blue source and a red source may appear purple or magenta to an observer. Similarly, light emitted by a combination of a blue source and a yellow source may appear white to an observer.

Also illustrated in FIG. 9 is the planckian locus 106, which corresponds to the location of color points of light emitted by a black-body radiator that is heated to various temperatures. In particular, FIG. 9 includes temperature listings along the black-body locus. These temperature listings show the color path of light emitted by a black-body radiator that is heated to such temperatures. As a heated object becomes incandescent, it first glows reddish, then yellowish, then white, and finally bluish, as the wavelength associated with the peak radiation of the black-body radiator becomes progressively shorter with increased temperature.

Illuminants which produce light which is on or near the black-body locus can thus be described in terms of their correlated color temperature (CCT).

The chromaticity of a particular light source may be referred to as the "color point" of the source. For a white light source, the chromaticity may be referred to as the "white point" of the source. As noted above, the white point of a white light source may fall along the planckian locus. Accordingly, a white point may be identified by a correlated color temperature (CCT) of the light source. White light typically has a CCT of between about 2000 K and 8000 K. White light with a CCT of 4000 may appear yellowish in color, while light with a CCT of 8000 K may appear more bluish in color. Color coordinates that lie on or near the black-body locus at a color temperature between about 2500 K and 6000 K may yield pleasing white light to a human observer.

"White" light also includes light that is near, but not directly on the planckian locus. A Macadam ellipse can be used on a 1931 CIE Chromaticity Diagram to identify color points that are so closely related that they appear the same, or substantially similar, to a human observer. A Macadam ellipse is a closed region around a center point in a two-dimensional chromaticity space, such as the 1931 CIE Chromaticity Diagram, that encompasses all points that are visually indistinguishable from the center point. A seven-step Macadam ellipse captures points that are indistinguishable to an ordinary observer within seven standard deviations, a ten step Macadam ellipse captures points that are indistinguishable to an ordinary observer within ten standard deviations, and so on. Accordingly, light having a color point that is within about a ten step Macadam ellipse of a point on the planckian locus may be considered to have the same color as the point on the planckian locus.

The ability of a light source to accurately reproduce color in illuminated objects is typically characterized using the color rendering index (CRI). In particular, CRI is a relative measurement of how the color rendering properties of an illumination system compare to those of a black-body radiator. The CRI equals 100 if the color coordinates of a set of test colors being illuminated by the illumination system are the same as the coordinates of the same test colors being irradiated by the black-body radiator. Daylight has the highest CRI (of 100), with incandescent bulbs being relatively close (about 95), and fluorescent lighting being less accurate (70-85).

For large-scale backlight and illumination applications, it is often desirable to provide a lighting source that generates a white light having a high color rendering index, so that objects and/or display screens illuminated by the lighting panel may appear more natural. Accordingly, to improve CRI, red light may be added to the white light, for example, by adding red emitting phosphor and/or red emitting devices to the apparatus. Other lighting sources may include red, green and blue light emitting devices. When red, green and blue light emitting devices are energized simultaneously, the resulting combined light may appear white, or nearly white, depending on the relative intensities of the red, green and blue sources.

One difficulty with solid state lighting systems including multiple solid state devices is that the manufacturing process for LEDs typically results in variations between individual LEDs. This variation is typically accounted for by binning, or grouping, the LEDs based on brightness, and/or color point, and selecting only LEDs having predetermined characteristics for inclusion in a solid state lighting system. LED lighting devices may utilize one bin of LEDs, or combine matched sets of LEDs from different bins, to achieve repeatable color points for the combined output of the LEDs. Even with binning, however, LED lighting systems may still experience significant variation in color point from one system to the next.

One technique to tune the color point of a lighting fixture, and thereby utilize a wider variety of LED bins, is described in commonly assigned United States Patent Publication No. 2009/0160363, the disclosure of which is incorporated herein by reference. The '363 application describes a system in which phosphor converted LEDs and red LEDs are combined to provide white light. The ratio of the various mixed colors of the LEDs is set at the time of manufacture by measuring the output of the light and then adjusting string currents to reach a desired color point. The current levels that achieve the desired color point are then fixed for the particular lighting device.

SUMMARY

In some embodiments according to the invention, a solid state lighting switch can include a first input control that can be configured to adjust a dimming indication or color indication for a solid state lighting fixture that is configured for coupling to the solid state lighting switch. A selective linking mechanism can be configured to activate a linked mode of operation of the switch to link the dimming indication to the CCT indication or to activate an unlinked mode of operation of the switch to unlink the dimming indication from the CCT indication.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS ACCORDING TO THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As described herein, embodiments according to the present invention can provide solid state lighting switches and fixtures that selectively link/unlink a color indication with a dimming indication provided by the switch. For example, in some embodiments according to the invention, the solid state lighting switch can link the color indication to the dimming indication when the switch is in a linked mode of operation. In contrast, the color indication can be unlinked (i.e. decoupled) from the dimming indication when the switch is in the unlinked mode of operation.

In the linked mode of operation, in some embodiments according to the invention, the dimming and color indications can be made equal to one another. In some embodiments according to the invention in the linked mode, the color indication can be a function of the dimming indication.

In the unlinked mode of operation, in some embodiments according to the invention, the dimming and color indications can be made equal to one another. In some embodiments according to the invention, the dimming indication can vary in response to input whereas the color indication is a constant voltage. In other embodiments according to the invention, the dimming indication can be a constant voltage, whereas the color indication varies in response to input.

In some embodiments according to the invention, the mode of operation can be provided by a selective linking mechanism. The selective linking mechanism can be mechanical so that otherwise separate inputs can be coupled together to allow both the color and the dimming indications to vary in unison with one another. In some embodiments according to the invention, the selective linking mechanism can be electrical so that the color indication is electrically coupled to the dimming indication.

In some embodiments according to the invention, the solid state lighting switch can include two separate inputs that can be manipulated independent of one another. For example, in some embodiments, one input can control the dimming indication and the other input can control the color indication (for example, in the unlinked mode). In contrast, when the switch is in the linked mode of operation (for example, when the inputs are linked together by a mechanical coupling), the color and dimming indications change in unison with one another.

In some embodiments according to the invention, the solid state lighting switch includes a single input. For example, in some embodiments, the single input can be used to control the dimming indication and color indication together (in linked operation). In contrast, in the unlinked mode (for example, when the single input controls only the dimming indication or the color indication, the other indication can be held constant.

It will be understood that the term "color indication" can mean any indication to specify a color to be provided by the fixture, such as the chromaticity or color point preferred by a user. The "color indication" can also be any indication of a correlated color temperature, a color rendering index, or any other indication of a color value. The term "dimming indication" can mean the intensity of light provided by the fixture, which can vary from a minimum dimming indication where the fixture provides minimum light intensity to a maximum dimming indication where the fixture provides maximum light intensity.

The Color Rendering Index (CRI) refers to a quantitative measure of the ability of a light source to reproduce the colors of objects in comparison with an ideal or natural light source. In contrast with the correlated color temperature (CCT) that describes the apparent color of a light source, the CRI refers to the color appearance of objects that are illuminated by the light source. A commonly used CRI value is referred to as the general CRI and includes coefficients corresponding to eight medium saturated colors (R1-R8). However, the CRI (referred to as the special CRI) also includes coefficients corresponding to six highly saturated colors (R9-R14). Of these, R9 corresponds to a strong red color, which may affect a red-green contrast that may be beneficial in rendering colors.

Figure 1:
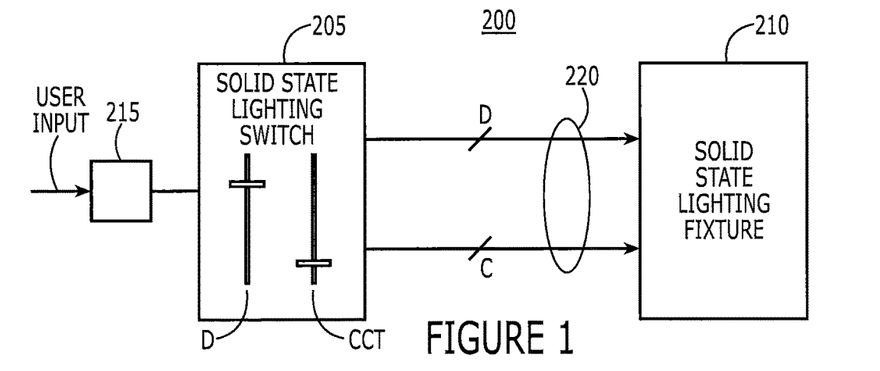
FIG. 1 is a schematic block diagram illustrating a solid state lighting switch in an unlinked mode of operation to provide separate dimming and color indications in some embodiments according to the invention.

FIG. 1 is a block diagram illustrating a solid state lighting switch 205 in an unlinked mode of operation to provide independent dimming and color indications to a solid state lighting fixture 210 in some embodiments according to the invention. According to FIG. 1, in some embodiments according to the invention, the dimming indication and the color indication are provided to first and second electrically isolated outputs of the switch 205 to provide independent inputs to the fixture 210. Accordingly, the dimming indication varies in response to the first input control, whereas the color indication can (independent of the dimming indication) vary in response to the second input control. Therefore, in operation, the user may indicate a desired color (color indication) by manipulating the second input control and vary the intensity of the light provided by the fixture 210 by manipulating the first input control to vary the dimming.

According to FIG. 1, the minimum setting of the first input control can be provided when the input is located at the lowest most position, whereas the maximum setting can be provided when the input control is at the uppermost position. Accordingly, the lowest dimming indication can be provided by positioning the first input control at the lowest most position and the maximum dimming indication can be provided by positioning the first input control at the uppermost position. Moreover, the input value can be varied by positioning the input at anywhere between the uppermost and lowest most positions. A minimum color indication can be provided by moving the second input control to the lowest most position, whereas a maximum color indication can be provided by moving the second input control to the uppermost position.

It will be understood that the input controls can be any type of inputs that allow a user to vary the dimming and color indications. For example, in some embodiments according to the invention, the inputs can be "sliders" that move in a straight line between the lowest most and the uppermost positions. In some embodiments according to the invention, the inputs can be knobs that rotate between positions. In some embodiments according to the invention, the inputs can be electronic rather than mechanical. For example, the inputs can be controls that are compatible with the Digital Addressable Lighting Interface (DALI) protocol, originally part of Europe's Standard 60929, which is a NEMA Standard (243-2004) in the United States.

In some embodiments according to the invention, the dimming and color indications can be voltage signals that vary between 0 and 10 volts. Other voltage ranges can also be used. In some embodiments according to the invention, the solid state switch 205 can be a single integrated unit with two separate input controls or two separate switches with respective input controls.

Figure 2:
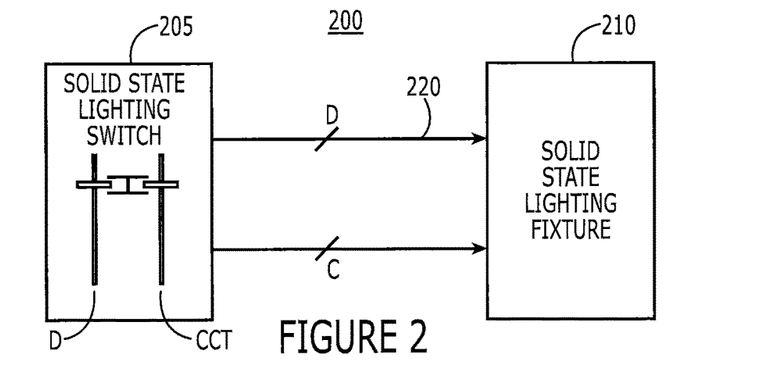
FIG. 2 is a schematic block diagram illustrating a solid state lighting switch in a linked mode of operation to provide selectively linked dimming and color indications to the fixture in some embodiments according to the invention.

The solid state lighting switch 205 can include or be coupled to a selective linking mechanism 215 to control whether the solid state lighting switch 205 operates in the linked or unlinked mode of operation. In some embodiments according to the invention, selective linking mechanism 215 can be a mechanical coupling 280 that links the inputs together so that when the user moves one of the inputs, the other input moves in unison, as illustrated in FIG. 2.

Accordingly, when the switch 205 operates in the linked mode, the dimming and color indications can be, for example, made equal to one another to provide incandescent style dimming at the solid state lighting fixture 210. In particular, the color indication is made equal to the dimming indication so that the color indication and the dimming indication have equal values and change in unison with one another because the inputs are linked together. These embodiments may provide operations so that the solid state lighting fixture 210 maintains the dimming indication and the color indication in equilibrium with one another so that the light provided by the solid state lighting fixture 210 follows the Planckian Locus 100 shown in FIG. 9.

Figure 3:
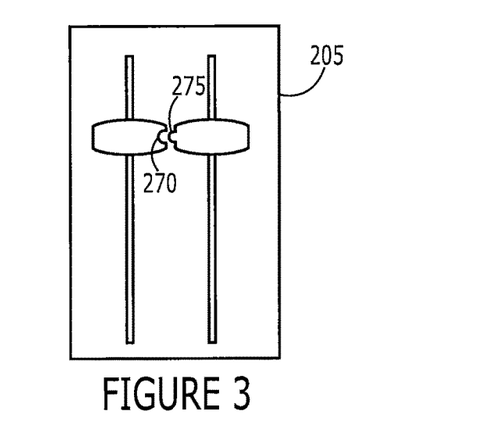
FIG. 3 is a schematic block diagram representation of the solid state switch in the linked mode of operation using a protrusion and recess as the selective linking mechanism in some embodiments according to the invention.

In some embodiments according to the invention, the mechanical coupling 280 can include a protrusion 275 that protrudes from a side of one of the inputs and a recess 270 included in a side of the other input, as illustrated in FIG. 3. The protrusion 275 and recess 270 can be positioned and configured so that the protrusion 270 can be coupled to, and decouple from, the recess 270 by the user input. Accordingly, when the inputs are decoupled from one another, the switch 205 operates in the unlinked mode, whereas when the inputs are coupled to one another, the switch 205 operates in the linked mode.

In some embodiments according to the invention, the selective linking mechanism 215 can be an electrical coupling that links the indications together so that when the user moves only one of the inputs, both the dimming and the color indications vary in unison with one another. For example, in some embodiments according to the invention, the selective linking mechanism 215 can be a circuit that electrically couples the outputs of the switch 205 together in response to a user selection via, for example, a button on the switch 205.

Referring to FIG. 1, a transmission medium 220 can include separate transmission mediums for the dimming indication and the color indication. In some embodiments according to the invention, however, the transmission medium 220 provides a single transmission medium over which separate channels are provided: one for the dimming indication and another for the color indication. In still other embodiments according to the invention, the transmission medium 220 can be provided via a wireless interface between the solid state lighting switch 205 and the solid state lighting fixture 210.

In some embodiments according to the invention, the dimming and color indications can be provided via a single transmission medium 220. For example, the dimming and color indications can be provided from the switch 205 to the fixture 210 over different channels in the medium 220. In some embodiments according to the invention, the dimming and color indications can be provided via the same channel, which may be interpreted as being linked by the fixture 210. In some embodiments according to the invention, the dimming and color indications can be provided via the same medium 220 and time multiplexed (or otherwise separated from one another within the medium 220).

The solid state lighting fixture 210 is configured to receive the dimming indication and the color indication via separate inputs. In other words, the solid state lighting fixture 210 can include a dimming input configured to receive the dimming indication and a color input configured to receive the color indication. In some embodiments according to the invention, the linking of the color indication to the dimming indication can be provided internally within the solid state lighting fixture 210, responsive to, for example, a software switch. In other embodiments, the color indication can be linked to the dimming indication at the switch 205, as described above, whereupon the separate (and equal) indications are provided to the fixture 210.

The solid state lighting fixture 210 can operate according to the linked mode of operation or the unlinked mode of operation. For example, as described above, in the linked mode of operation the color indication can be made equal to the dimming indication to provide incandescent style dimming at the lighting fixture 210. In the unlinked mode of operation, the color indication can be set independent of the dimming indication so that color and dimming can be set independently of one another.

Figure 4:
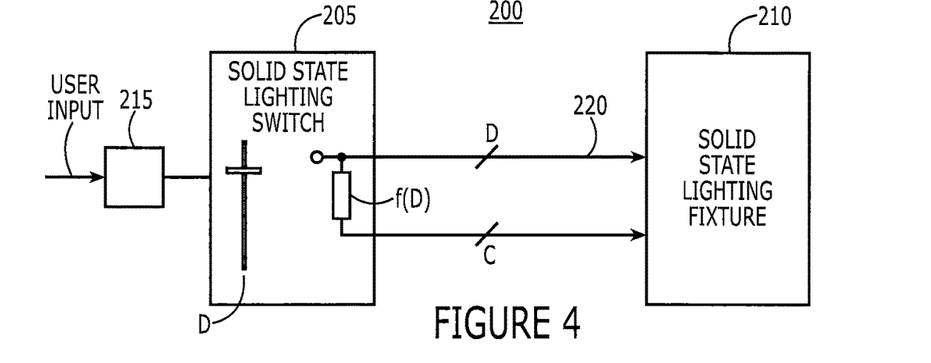
FIG. 4 is a schematic block diagram illustrating a solid state lighting switch in a linked mode of operation to provide a color indication as a function of the dimming indication to provide a modified incandescent dimming style in some embodiments according to the invention.

FIG. 4 is a schematic block diagram illustrating another embodiment of the solid state lighting switch 205 in the linked mode of operation in some embodiments according to the invention. In particular, the solid state lighting switch 205 is configured so that the color indication is a function of the dimming indication. According to FIG. 4, the color indication can be made, for example, proportional to the dimming indication by providing an electrical component across the outputs which maintains the proportional relationship between the two indications. Accordingly, the maximum value of the color indication can be limited, for example, to a value less than that which would otherwise be provided if the second input control were to be moved to the uppermost position. In contrast, the dimming indication is configured to move over an entire range in response to the manipulation of the input control. Such a configuration may be used to limit the maximum value of the color indication to, for example, limit the warmest color provided by the solid state lighting fixture while still allowing a maximum range of dimming.

It will be understood that, in some embodiments according to the invention, the function in FIG. 4 may make the color indication equal to the dimming indication, such as by coupling the indications together. Accordingly, the color indication can vary in unison with and be made equal to the dimming indication to provide incandescent style dimming at the fixture 210. These embodiments may provide operations so that the solid state lighting fixture 210 maintains the dimming indication and the color indication in equilibrium with one another so that the light provided by the solid state lighting fixture 210 follows the Planckian Locus 100 shown in FIG. 9.

Figure 5:
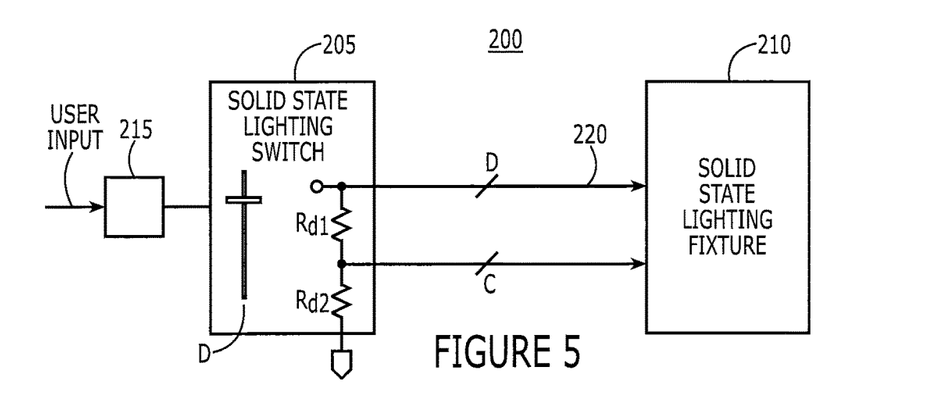
FIG. 5 is a schematic block diagram illustrating a solid state lighting switch in the linked mode of operation to provide the color indication that is proportional to the dimming indication via a voltage divider to provide the modified incandescent dimming style of FIG. 4, in some embodiments according to the invention.

FIG. 5 is a schematic block diagram that illustrates another embodiment of the solid state lighting switch 205 in the linked mode of operation in some embodiments according to the invention. In particular, FIG. 5 illustrates a variation of the embodiment illustrated in FIG. 4 wherein the color indication is a function of the dimming indication. As shown in FIG. 5, the relationship between the color indication and the dimming indication can be provided by a voltage divider circuit provided by the arrangement of resistors $R_{d1}$ and $R_{d2}$. As discussed above in relation to FIG. 4, the type of arrangement shown in FIG. 5 can be used to limit the maximum value of the color indication while still allowing the dimming indication to vary across the entire range associated with movement of the first input control.

It will further be understood that although FIG. 4 shows a single input as part of the switch 205 providing both the dimming and color indications, in some embodiments according to the invention, the switch can include a second input that functions when the switch 205 is in the unlinked mode (responsive to the selective linking mechanism 215). In such embodiments, the switch 205 may provide the linked and unlinked modes of operation in response to an electric circuit as described above.

Figure 6:
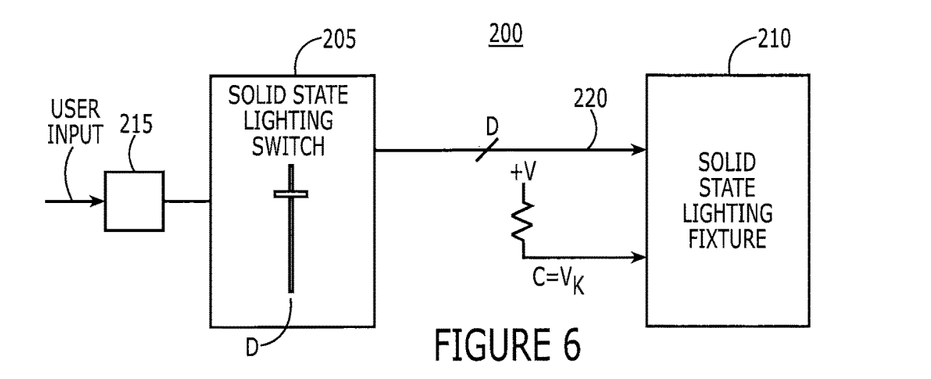
FIG. 6 is schematic block diagram illustrating a solid state lighting switch in the unlinked mode of operation to provide separate dimming and color indications for constant color dimming operation in some embodiments according to the invention.

FIG. 6 is a schematic block diagram that illustrates another embodiment of the solid state lighting switch in the unlinked mode of operation in some embodiments according to the invention. According to FIG. 6, the color indication is held at a constant voltage ($V_k$) so that the intensity of the light provided by the fixture 210 varies while maintaining a constant color (referred to herein as constant color dimming). Accordingly, in these embodiments according to the invention, the color indication is independent of the input control.

In some embodiments according to the invention, it will be understood that the color indication can be maintained at the constant voltage $V_k$ within the solid state lighting fixture 210. In other words, the constant color indication can be provided within the solid state lighting fixture 210 using a local pull-up or pull-down resistor or software. Therefore, any variation in the color indication provided by the solid state lighting switch 205 may be ignored by the solid state lighting fixture and instead may utilize the internal value for the constant color indication.

It will be further understood that in some embodiments according to the invention, rather than hold the color indication at a constant voltage ($V_k$) as shown in FIG. 6, the dimming indication can be held at a constant voltage ($V_k$) so that the intensity of the light provided by the fixture 210 is maintained while allowing the color indication to vary at the fixture 210. Accordingly, in these embodiments according to the invention, the light from the fixture is held constant while the color may be varied via the input control.

Figure 7:
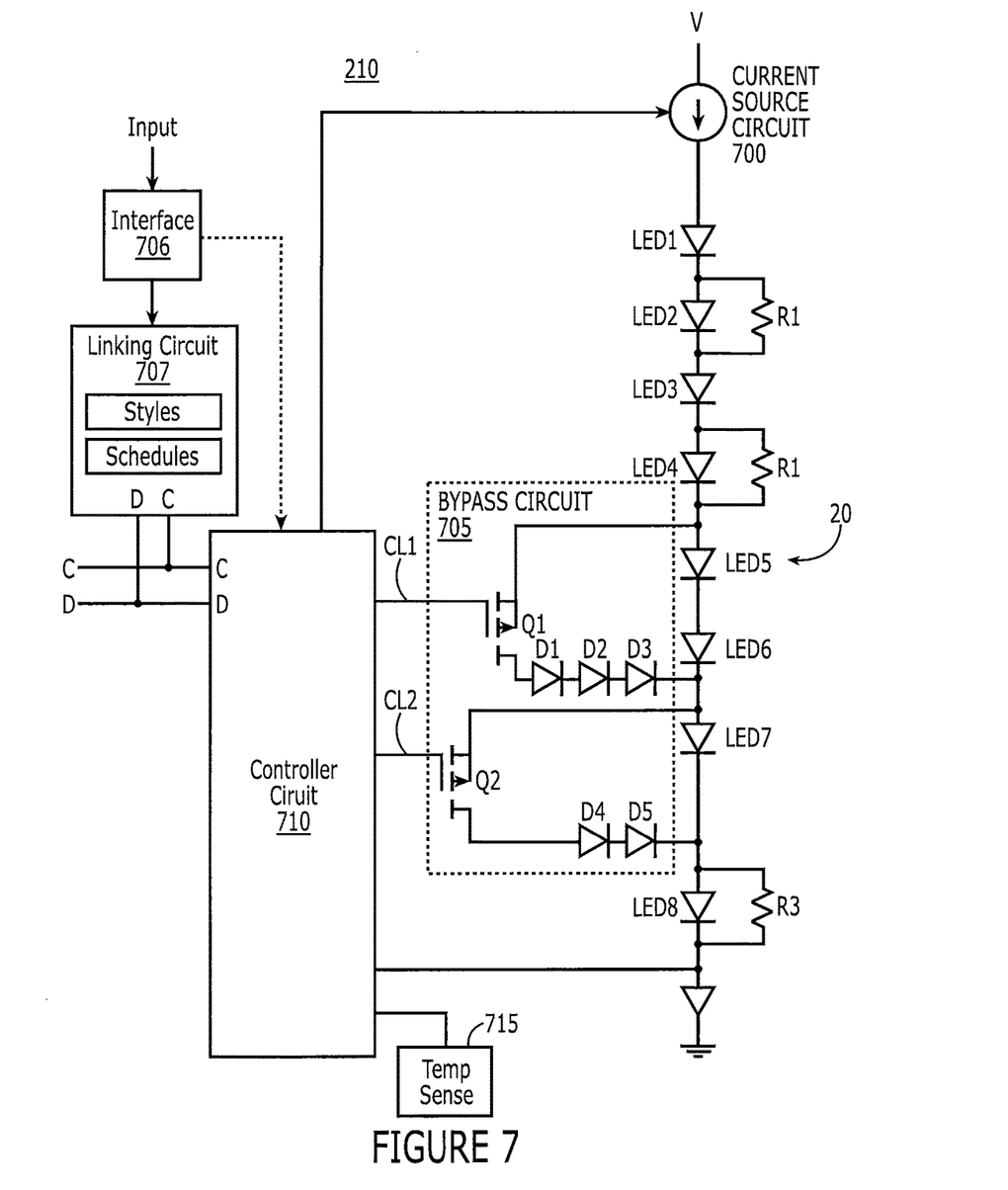
FIG. 7 is a schematic diagram illustrating a solid state lighting fixture configured to operate in response to selectively linked/unlinked dimming and correlated color indications in some embodiments according to the invention.

FIG. 7 is a schematic diagram illustrating the solid state lighting fixture 210 in some embodiments according to the invention. According to FIG. 7, the solid state lighting fixture 210 includes a controller circuit 710 having separate inputs for the dimming and color indications provided by the solid state lighting switch 205.

The controller circuit 710 can be coupled to a current source circuit 700 and is configured to vary the amount of current sourced by the current source circuit 700 to control the dimming of the light provided by the fixture 210. The controller circuit 710 is also coupled to a by-pass circuit 705 which includes first and second circuits used to by-pass selected ones of the solid state light emitting devices within the solid state lighting string 20. In particular, the by-pass circuit 705 selectively by-passes ones of the solid state light emitting devices in response to duty cycle signals CL1 and CL2 provided by the controller circuit 710. It will be understood that the duty cycle signals CL1 and CL2 can be used to affect the color output of the solid state lighting string 20 in association with the color indication provided by the solid state lighting switch 205. The controller circuit 710 is also coupled to a temperature sensor 715 that provides an indication to the control circuit of the ambient temperature associated with the solid state lighting string 20 to the controller circuit 710.

The controller circuit 710 can operate in response to the dimming and color indications in accordance with the linked or unlinked mode of operation to provide the different types of dimming and color control described above in reference to FIGS. 1-6. For example, in the embodiments described above in reference to the linked mode of operation, the dimming and color indications can be equal to or proportional to one another so that the controller circuit 710 controls the solid state lighting string 20 using the current source circuit 700 and the by-pass circuit 705 to provide an incandescent style dimming by the fixture 210, where the color output of the fixture 210 may be limited based on the which of the embodiments in FIGS. 1-6 are implemented by the switch 205.

In some embodiments according to the invention, the selective linking of the dimming and color indications can be provided by the fixture, such as in the controller circuit 710. For example, in some embodiments according to the invention, the dimming and color indications can be linked together within the controller circuit responsive to one or more preferences that are programmed into, or otherwise specified by, the controller circuit 710. In some embodiments according to the invention, for example, a user may specify that the dimming and color indications are linked together according to a particular schedule (e.g., day, night, morning, afternoon, evening, time of year etc.), whereas the dimming and color indications may be unlinked otherwise. In some embodiments according to the invention, for example, the user may also specify any of the types of selective linking to be provided, such as incandescent style, constant color, etc. as described herein.

In some embodiments according to the invention, the selective linking of the dimming and color indications can be provided external to the controller circuit 710, but within the fixture 210. For example, the selective linking may be provided by a linking circuit 707 that operates in coordination with the controller circuit 710. In some embodiments according to the invention, the linking circuit 707 operates to provide any or all of the types of selective linking described herein. For example, the linking circuit 707 may receive both or only a single one of the dimming and color indications from the switch 205 and selectively link the indications before being provided as the inputs to the controller circuit 710. In some embodiments according to the present invention, the linking circuit 707 may operate according to the schedules and styles described above. In some embodiments according to the invention, the schedules and styles of selective linking can be maintained by the linking circuit 707, within the controller circuit 710, or by a separate circuit that is accessible to the linking circuit 707 or the controller circuit 710. In some embodiments according to the invention, the schedules and styles of selective linking can be set by the user via a fixture interface circuit 706. In such embodiments according to the invention, the user may select among a plurality of predefined linking styles and/or schedules or define a custom schedule and/or linking style. The interface circuit 706 can be any interface that is sufficient to allow the user to interact with the fixture 710 to accomplish the selections described herein. In some embodiments according to invention, the interface circuit 706 is a keypad, or switches accessible to the user. In some embodiments according to invention, the interface circuit 706 is remote control interface circuit, such as an infrared interface. In some embodiments according to invention, the interface circuit 706 is coupled to the controller circuit 710 to allow the user to select the settings described herein that may be provided by the controller circuit 710 rather than by the linking circuit 707.

In the unlinked mode of operation, the controller circuit 710 may control the current source circuit 700 and the by-pass circuit 705 independently of one another to allow the user more freedom in choosing the color provided by the fixture 210.

Embodiments according to the present invention can utilize bypass compensation circuits (i.e., bypass circuits) as described in co-pending and commonly assigned U.S. patent application Ser. No. 12/566,195 entitled "Solid State Lighting Apparatus with Controllable Bypass Circuits and Methods of Operating Thereof" and co-pending and commonly assigned U.S. patent application Ser. No. 12/566,142 entitled "Solid State Lighting Apparatus with Configurable Shunts", the disclosures of which are incorporated herein by reference. It will be understood that the two circuits included in the bypass circuit 705 can be referred to separately as a bypass circuit or collectively as a bypass circuit, when for example, two bypass circuits are used to provide color control of the fixture 210.

The bypass circuits may switch between LED(s), variably shunt around LED(s) and/or bypass LED(s) in a solid state lighting fixture 210 using the duty cycle signals provided by the controller circuit 710 in response to the dimming and color indications. According to some embodiments, the output of the lighting fixture is modeled based on one or more variables, such as current, temperature and/or LED bins (brightness and/or color bins) used, and the level of bypass/shunting employed. The model may be adjusted for variations in individual lighting devices.

As shown in FIG. 7, the fixture 210 can include the string 20 including LEDs (LED 1 through LED9) connected in series between a voltage source V and ground. The controller circuit 720 is coupled to the string 20 and control gates of transistors Q1 and Q2 via duty cycles signals CL1 and CL2.

The string 20 may include LEDs that emit different colors of light when current is passed through the string. For example, some of the LEDs may include phosphor coated LEDs that emit broad spectrum white, or near-white light when energized. Some of the LEDs may be configured to emit blue shifted yellow (BSY) light as disclosed, for example, in commonly assigned U.S. Pat. No. 7,213,940 issued May 8, 2007, entitled "Lighting Device And Lighting Method", and/or blue-shifted red (BSR) light as disclosed in U.S. application Ser. No. 12/425,855, filed Apr. 19, 2009, entitled "Methods for Combining Light Emitting Devices in a Package and Packages Including Combined Light Emitting Devices", or U.S. Pat. No. 7,821,194, issued Oct. 26, 2010, entitled "Solid State Lighting Devices Including Light Mixtures" the disclosures of which are incorporated herein by reference. Others of the LEDs may emit saturated or near-saturated narrow spectrum light, such as blue, green, amber, yellow or red light when energized. In further embodiments, the LEDs may be BSY, red and blue LEDs as described in co-pending and commonly assigned United States Patent Application Publication No. 2009/0184616, the disclosure of which is incorporated herein by reference, phosphor converted white or other combinations of LEDs, such as red-green-blue (RGB) and/or red-green-blue-white (RGBW) combinations.

In one example, LED5 and LED6 may be red LEDs and LED7 may be a blue LED. The remaining LEDs may be BSY and/or red LEDs.

The string 20 of LEDs includes subsets of LEDs that may be selectively bypassed by activation of transistors Q1 and Q2. For example, when transistor Q1 is switched on, LED5 and LED6 are bypassed, and non-light emitting diodes D1, D2 and D3 are switched into the string 20. Similarly, when transistor Q2 is switched on, LED7 is bypassed, and non-light emitting diodes D4 and D5 are switched into the string 20. Non-light emitting Diodes D1 through D5 are included so that variations in the overall string voltage are reduced when LED5, LED6 and LED7 are switched out of the string by transistors Q1 and Q2.

The controller circuit 720 controls the duty cycles of the transistors Q1 and Q2 via duty cycle signals CL1 and CL2 based on control models loaded in the controller circuit 720. In particular, the duty cycles of the transistors Q1 and Q2 may be controlled in response to a model that is based on factors, such as a temperature sensor measurement provided by the temperature sensor 12 and/or a measurement of current in the string 20, for example, as reflected by variations in voltage across LED9 (reference U.S. application Ser. No. 12/968,789, entitled "LIGHTING APPARATUS USING A NON-LINEAR CURRENT SENSOR AND METHODS OF OPERATION THEREOF" filed Dec. 15, 2010. The model may also be based on factors, such as the brightness and/or chromaticity bins of the LEDs (LED1-LED9). The duty cycles of the transistors Q1 and Q2 may be controlled so that the total combined light output by the string 20 has a desired chromaticity, or color point, which can be specified by the color indication.

In some embodiments, the controller circuit 720 may be a suitably configured programmable microcontroller, such as a Atmel ATtiny10 microcontroller. The model may use a Bezier surface that is defined based on a plurality of control points to select a duty cycle for the red or blue LEDs in response to detected temperature and current through the string 20.

Predictive models can be developed to allow tuning and operational control of the LEDs in the fixture 210. In particular embodiments, a Bézier surface can be constructed based on the variables of light output characteristic (such as a color indication, color point (u', v') and/or intensity in lumens), temperature, current level (dimming indication) and shunt level associated with the duty cycle. These Bézier surfaces are then used as a model to control the operation of the fixture 210 having the same combination of LEDs as the reference set of LEDs.

A Bézier surface is a mathematical tool for modeling a multidimensional function using a finite number of control points. In particular, a number of control points are selected that define a surface in an M-dimensional space. The surface is defined by the control points in a manner similar to interpolation. However, although the surface is defined by the control points, the surface does not necessarily pass through the control points. Rather, the surface is deformed towards the control points, with the amount of deformation being constrained by the other control points.

A given Bézier surface of order (n, m) is defined by a set of (n+1)(m+1) control points $k_{ij}$. A two-dimensional Bézier surface can be defined as a parametric surface where the position of a point p on the surface as a function of the parametric coordinates u, v is given by:

$$p(u, v) = \sum_{i=0}^{n} \sum_{j=0}^{m} B_i^n(u) B_j^m(v) k_{i,j}$$

where the Bézier function B is defined as $$B_i^n(u) = \binom{n}{i} u^i (1-u)^{n-i}$$

and $$\binom{n}{i} = \frac{n!}{i!(n-i)!}$$

is the binomial coefficient.

Figure 8:
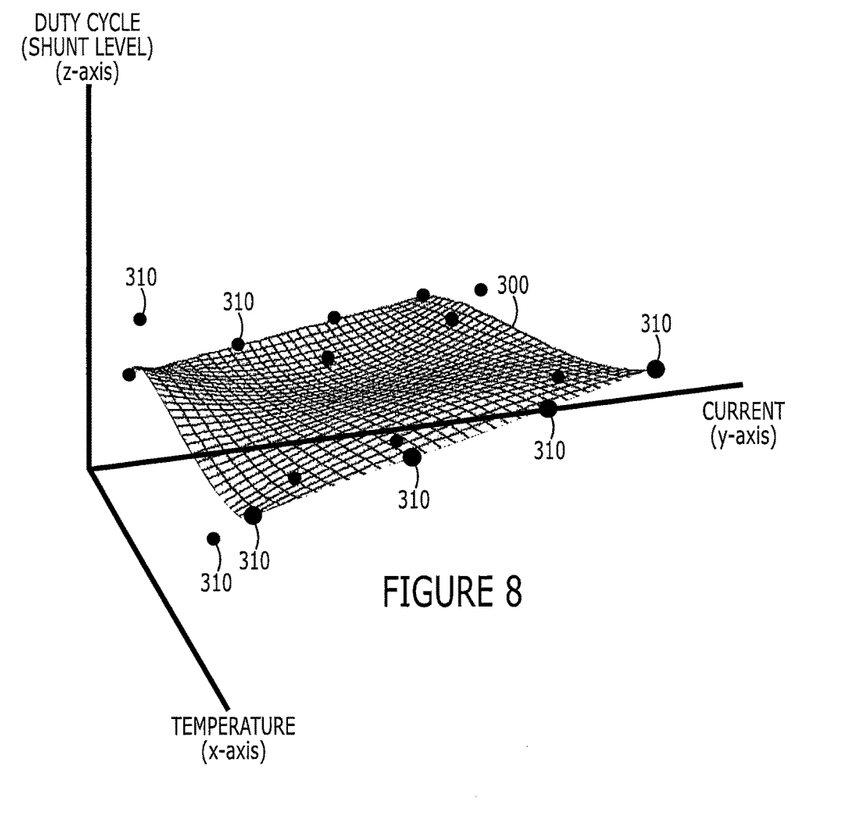
FIG. 8 is a representation of a Bezier surface representing a model utilized by the solid state lighting fixture in some embodiments according to the invention.

An example of a Bézier surface 300 is illustrated in FIG. 8. The Bézier surface 300 illustrated in FIG. 8 represents an LED shunt level (z-axis) associated with the duty cycle, plotted as a function of temperature (x-axis) and current (y-axis) of a solid state lighting fixture 210. The surface 300 is defined by sixteen control points 310, which are points in the three-dimensional space represented by the x-, y- and z-axes shown in FIG. 8.

According to FIG. 8, the surface 300 is deformed towards the control points 310, but the control points 310 are not all on the surface 300. The Bézier surface 300 provides a mathematically convenient model for a multidimensional relationship, such as modeling LED shunt level as a function of temperature and current for a given output chromaticity (i, e, color indication), because the Bézier surface is completely characterized by a finite number of control points (e.g. sixteen).

The manufacture, calibration and/or operation of the fixture 210 having the same combination of LEDs as those in the reference set may be carried out as illustrated in FIG. 7.

A five-axis model (u', v', T, I and S) can be collapsed based on the desired color point (u',v'), or color indication, to a three-axis model in which the shunt level (i.e., duty cycle) is determined as a function of current (I) used as the dimming indication, and temperature (T). That is, a three-axis model is constructed in which shunt level is dependent on current and temperature level for a given color point selected by the user based on the color indication.

In some embodiments, a set of control points, which in some embodiments may include 16 control points, is established for the desired u',v' color indication, such that the shunt level or duty cycle of the a selected group of one or more controlled red LEDs required to achieve the desired (u',v') color indication, is a dependent variable based on temperature and current level or dimming indication. A corresponding family of sets of 16 control points is established for the desired u',v' color indication such that the shunt level of a group of one or more controlled blue LEDs required to achieve the desired (u',v') color indication is a dependent variable based on temperature and current level (dimming indication). These control points are then used by the controller circuit 710 to control the light output of the fixture 210.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed:

1. A method of operating a switch comprising:
   providing a dimming indication and a color indication configured for coupling to a solid state lighting device responsive to a first input control of the switch;
   selectively linking the color indication to the dimming indication responsive to activation of a linked mode of operation for the switch; and
   transmitting the color indication and the dimming indication from the switch.

2. The method of claim 1 further comprising:
   selectively unlinking the color indication from the dimming indication responsive to activation of an unlinked mode of operation for the switch.

3. The method of claim 1 further comprising:
   providing the color indication responsive to a second input control to the switch.

4. The method of claim 3 wherein selectively linking the color indication to the dimming indication comprises selectively linking outputs of the switch to one another to couple the color indication to the dimming indication.

5. The method of claim 2 wherein selectively unlinking comprises coupling the dimming indication to a first output of the switch and coupling the color indication to a second output of the switch in the unlinked mode of operation to provide independent outputs from the switch.

6. The method of claim 4 wherein a relationship of the color indication to the dimming indication provides incandescent style dimming.

7. The method of claim 1 wherein the color indication is proportional to the dimming indication to provide limited incandescent style dimming at the solid state lighting device.

8. The method of claim 1 wherein the switch comprises a wireless interface configured to transmit the color indication and the dimming indication wirelessly to the solid state lighting device.

9. The method of claim 1 wherein the color indication comprises a correlated color temperature.

10. The method of claim 1 wherein the color indication comprises a color registered index.

11. The method of claim 1 wherein transmitting the color indication and the dimming indication from the switch comprises wirelessly transmitting the color indication and the dimming indication from the switch.

12. A solid state lighting switch configured for providing a color indication and a dimming indication to a solid state lighting fixture, the solid state lighting switch comprising:
   an input control; and
   a selective linking mechanism configured to control whether the switch operates in a linked mode or in an unlinked mode, wherein in the unlinked mode the dimming indication and the color indication are unlinked such that manipulation of the input control causes change to only the dimming indication or only the color indication and wherein in the linked mode the dimming indication and the color indication are linked such that manipulation of the input control causes change to both the dimming indication and the color indication.

13. The solid state lighting switch of claim 12, wherein in the linked mode the dimming indication and the color indication are linked such that manipulation of the input control causes the color indication to vary as a function of the dimming indication.

14. The solid state lighting switch of claim 12, wherein in the linked mode the dimming indication and the color indication are linked such that manipulation of the input control causes the color indication and the dimming indication to vary in unison with one another.

15. The solid state lighting switch of claim 12, wherein the input control is a first input control configured to control only the color indication when the switch operates in the unlinked mode, wherein the switch further comprises a second input control configured to control only the dimming indication when the switch operates in the unlinked mode, and wherein in the linked mode the dimming indication and the color indication are linked such that manipulation of the first input control causes change to both the dimming indication and the color indication.

16. The solid state lighting switch of claim 12, wherein the input control is the only input control of the switch for controlling the dimming indication and the color indication.

17. The solid state lighting switch of claim 12, wherein in the unlinked mode the dimming indication and the color indication are unlinked such that manipulation of the input control from a first position to a second position causes change to only the dimming indication or only the color indication, and wherein in the linked mode the dimming indication and the color indication are linked such that manipulation of the input control from the first position to the second position causes change to both the dimming indication and the color indication.

18. The solid state lighting switch of claim 12, wherein the selective linking mechanism is electrical such that the color indication is electrically coupled to the dimming indication in the linked mode.

19. The solid state lighting switch of claim 12, wherein the selective linking mechanism is configured to control whether the switch operates in the linked mode or in the unlinked mode in response to a user selection between the linked mode and the unlinked mode.

20. The solid state lighting switch of claim 12, wherein the selective linking mechanism is configured to control whether the switch operates in the linked mode or in the unlinked mode in accordance with a user-specified schedule that defines times at which the switch is to operate in the linked mode and times at which the switch is to operate in the unlinked mode.

21. The solid state lighting switch of claim 12, wherein in the linked mode the dimming indication and the color indication are linked with a type of linking selected by a user from among multiple possible types of linking.

22. The solid state lighting switch of claim 12, wherein the switch comprises a digital addressable lighting interface compatible switch.

23. The solid state lighting switch of claim 12, wherein the switch comprises a wireless interface configured to transmit the color indication and the dimming indication wirelessly to the solid state lighting fixture.

24. A non-transitory computer-readable medium having stored thereon instructions that when executed provide a solid state lighting switch configured for providing a color indication and a dimming indication to a solid state lighting fixture, wherein the instructions when executed provide the solid state lighting switch with:
   an input control; and
   a selective linking mechanism configured to control whether the switch operates in a linked mode or in an unlinked mode, wherein in the unlinked mode the dimming indication and the color indication are unlinked such that manipulation of the input control causes change to only the dimming indication or only the color indication and wherein in the linked mode the dimming indication and the color indication are linked such that manipulation of the input control causes change to both the dimming indication and the color indication.

25. The non-transitory computer-readable medium of claim 24, wherein in the unlinked mode the dimming indication and the color indication are unlinked such that manipulation of the input control from a first position to a second position causes change to only the dimming indication or only the color indication, and wherein in the linked mode the dimming indication and the color indication are linked such that manipulation of the input control from the first position to the second position causes change to both the dimming indication and the color indication.

26. The non-transitory computer-readable medium of claim 24, wherein the selective linking mechanism is configured to control whether the switch operates in the linked mode or in the unlinked mode in response to a user selection between the linked mode and the unlinked mode.

27. The non-transitory computer-readable medium of claim 24, wherein the selective linking mechanism is configured to control whether the switch operates in the linked mode or in the unlinked mode in accordance with a user-specified schedule that defines times at which the switch is to operate in the linked mode and times at which the switch is to operate in the unlinked mode.

* * * * *